United States Patent [19]

Stevenson et al.

[11] Patent Number: 5,194,498
[45] Date of Patent: Mar. 16, 1993

[54] POLY(VINYL CHLORIDE) BLENDS AND ADDITIVES THEREFOR

[75] Inventors: Janis C. Stevenson, Langhorne; Hsing-Yeh Parker, Holland, both of Pa.

[73] Assignee: Rohm and Haas Company, Philadelphia, Pa.

[21] Appl. No.: 756,733

[22] Filed: Sep. 9, 1991

[51] Int. Cl.$^5$ .............................................. C08L 27/06
[52] U.S. Cl. ........................................ 525/81; 525/201; 525/301; 525/309; 525/310; 525/902; 523/201
[58] Field of Search ............... 525/81, 201, 301, 309, 525/310, 902; 523/201

[56] References Cited

U.S. PATENT DOCUMENTS 3,251,904  5/1966  Souder et al. ......................... 525/85
3,859,384  1/1975  Carty et al. .......................... 525/902
4,426,493  1/1984  Falk ..................................... 525/239
4,654,400  3/1987  Lohmeijer et al. .................... 525/64

FOREIGN PATENT DOCUMENTS

217397A2  10/1986  European Pat. Off. .
  252383   1/1988  German Democratic Rep. .
03037255   7/1989  Japan .

*Primary Examiner*—Maurice J. Welsh
*Assistant Examiner*—Rachel Johnson
*Attorney, Agent, or Firm*—Roger K. Graham

[57] ABSTRACT

This invention relates to poly(vinyl chloride) injection molding compositions which contain novel additive polymers which modify the rheology characteristics of the composition, and to the novel additive polymers themselves.

19 Claims, No Drawings

POLY(VINYL CHLORIDE) BLENDS AND ADDITIVES THEREFOR

BACKGROUND OF THE INVENTION

1. Field of the Invention

This invention relates to poly(vinyl chloride) (PVC) compositions, especially those suitable for injection molding, and to novel additives which modify the rheological properties of the PVC composition.

2. Description of the Prior Art

It is known that processing of rigid poly(vinyl chloride), that is, polymers containing at least 80 weight percent vinyl chloride units and containing little or no plasticizer, is extremely difficult to accomplish without the use of polymeric processing aids. Such processing aids when used at levels of from about 0.1 to about 10 parts per 100 parts of poly(vinyl chloride) (PVC), more usually from about 0.5 to about 10 phr (parts per 100 parts of PVC), cause the PVC to flux under heat into a thermoplastic leathery state on a mill roll or other similar mixer. The processing aids further allow the PVC to be processed in an extruder into a molten thermoplastic state without the need for high shear forces and temperatures. They further impart to the processed product smoother, uniform surfaces.

A thorough description of processing aids for PVC may be found in "Thermoplastic Polymer Additives, Theory and Practice," Edited by John T. Lutz, Jr., Marcel Deckker, Inc., New York and Basel, 1988 (chapter by R. P. Petrich and John T. Lutz, Jr.) and "History of Polymer Composites," Edited by R. B. Seymour and R. D. Deanin, VNU Science Press BV, Netherlands, 1987 (chapter by D. L. Dunkelberger).

Particularly useful as processing aids have been high molecular weight polymers which are predominately composed of units derived from methyl methacrylate, which have been commercially available for about 30 years. These additives are especially useful in that they do not detract from the important physical properties expected from the final processed PVC object, such as heat distortion temperature, tensile strength, and impact-resistance properties.

One deficiency that the acrylic processing aids of commerce have is that the high molecular weight polymers, even at the low levels used, either maintain or increase the melt viscosity of the resultant blend. This is especially undesirable in injection molding applications, where it is desired to have a melt of low viscosity for ease in mold-filling. Lowering of the molecular weight of the processing aid will decrease the melt viscosity of the blend, but sometimes at the sacrifice of the heat distortion temperature of the final processed object.

Similar effects, i.e., improved flow at the expense of lowered heat distortion temperature, are found with other non-polymeric additives, such as plasticizers, or when a lower molecular weight PVC or a PVC copolymer is used.

Several polymeric additives based on polymers of (meth)acrylate esters have been disclosed as flow improvers for PVC. Simple homopolymers and copolymers, although effective, may delay fusion of the PVC, which is undesirable for rapid processing of the blend and for avoidance of overheating of the blend. Further, such single-stage materials are generally soft, difficult to isolate from their preparative media, and difficult to blend with the PVC. Further, when the additive is immiscible with the PVC and of significantly differing melt viscosity at processing temperatures, orientation effects may be seen in injection molding, and delamination of the processed blend may occur.

Multistage structures, often known as core-shell polymers, usually specifically described as graft polymers, have been described as useful for this purpose. However, the combination of relatively high molecular weight for the various stages and the chemical combination of the stages (grafting) make such materials less suitable for flow improvement in PVC formulations based on low molecular weight PVC, such as those of potentially commercial interest for injection molding. Further, when the molecular weight of the first stage is decreased and the compatibility with the PVC lessened to produce an additive which does not increase the melt viscosity of the blend with PVC, then delay of fusion is noted.

There has thus been a long-felt need for an additive which will allow PVC to be processed in injection molding to useful objects which maintain the physical properties of a medium- to high-molecular weight PVC, such as heat distortion temperature and toughness, while being capable of being molded under commercially practical and safe conditions of temperature, time, and pressure, which will further produce uniform, non-delaminated blends with PVC, which does not detract from, and preferentially enhances, the impact strength of the PVC blend, and which produces minimal deleterious effects on the fusion properties of the blend.

SUMMARY OF THE INVENTION

We have discovered that an appropriate non-crosslinked higher, alkyl, i.e., from four to twelve carbon atoms in the alkyl group, (meth)acrylate ester first-stage polymer capable of functioning as an additive to reduce viscosity in PVC blends can better achieve these desired properties by encapsulating the first stage or core polymer by an appropriately crosslinked second polymer (shell). The second polymer may be crosslinked by chemical or physical bonds. It is important that the first stage polymer not be deliberately crosslinked, such as by a post-cure or vulcanization with, e.g., peroxide, or by incorporation of multifunctional monomers such as divinylbenzene or ethylene glycol dimethacrylate, so that multi-functional monomers should be avoided in its polymerization. Preparative conditions, such as polymerization at temperatures below about 60 degrees C., should be chosen which are known to those skilled in the art to decrease crosslinking. Preferably the molecular weight should be controlled (decreased), by means such as use of a chain-transfer agent, so as to avoid inadvertent crosslinking known to be common in higher alkyl acrylate ester polymerizations in emulsion.

The encapsulating second shell polymer serves several functions in improving the utility of the core/shell polymer as an additive for injection molding of PVC. Especially when it is a polymer having a glass temperature higher than that of the core, the second shell aids in isolation of the core/shell polymer, and in handling the core/shell polymer during addition to the PVC for blending. Especially if the second shell polymer is a rubbery polymer, such as a polymer rich in units derived from butyl acrylate, the presence of the shell polymer toughens the resulting PVC blend more effectively than the core polymer alone. A third stage or outer shell polymer may be present, which may serve as a compatibilizing aid with the PVC, or as a processing aid to promote fusion.

DESCRIPTION OF THE INVENTION AND PREFERRED EMBODIMENTS

More specifically, the additive structure is a core-/shell polymer comprising:

a) a core of a polymer containing at least about 80 weight percent of units derived from a higher alkyl (meth)acrylate, the higher alkyl group containing from four to twelve carbon atoms, such as butyl acrylate, 2-ethylhexyl acrylate, octyl methacrylate, and the like, the core polymer not containing units derived from a graftlinking or crosslinking monomer, and the core polymer not being deliberately crosslinked, where preferably the molecular weight of the core polymer is from about 5,000 to about 100,000;

b) a shell stage of a crosslinked polymer, the crosslinked polymer containing:

1) at least about 90 weight percent of units derived from one or more of vinyl aromatic monomers, such as styrene, vinyl toluene, and the like, or alkyl esters of (meth)acrylic acid, wherein the alkyl esters are derived from alcohols of from one to four carbon atoms, such as methyl methacrylate, ethyl methacrylate, methyl acrylate, butyl acrylate, and the like;

2) from about 0.5 to about 10 weight percent of units derived from at least one of:

a) a multifunctional monomer containing two or more copolymerizable double bonds, such as divinylbenzene, butylene glycol dimethacrylate, butylene glycol diacrylate, allyl methacrylate, diallyl maleate, and the like;

b) an alkali, alkaline earth, or transition metal salt of a copolymerizable unsaturated acid.

The core/shell polymer may further comprise a final shell stage of a polymer containing at least about 70 weight percent of units derived from one or more of vinyl aromatic monomers or lower alkyl esters of methacrylic acid, wherein the lower alkyl esters are derived from alcohols of from one to four carbon atoms.

Preferred are the compositions wherein the higher alkyl (meth)acrylate is n-butyl acrylate and the lower alkyl ester of methacrylic acid of the final shell stage is the methyl ester. For best impact properties, it is preferred the monomer in the shell stage be butyl acrylate.

The unsaturated acid and/or its alkali, alkaline earth or transitional metal salt must be copolymerizable with the alkyl (meth)acrylate or vinyl aromatic. Alkali encompasses sodium, potassium, lithium, cesium, and rubidium, of which sodium and potassium are preferred. Alkaline earth encompasses calcium, magnesium, strontium, and barium, of which calcium and magnesium are preferred. Transition metal encompasses chromium, manganese, iron, cobalt, nickel, copper, zinc, zirconium, molybdenum, cadmium, lanthanum, tungsten, and mercury, of which zinc is preferred.

The acid groups may be derived by partial hydrolysis or pyrolysis of a blocked acid group, such as hydrolysis of a methyl ester or pyrolysis of a tertiary-butyl ester. However, it is most convenient to incorporate same by copolymerization of a suitable unsaturated acid-containing monomer, which is co-polymerized as the unsaturated acid and then post-treated to form the salt, or alternatively may be copolymerized directly as the salt. The unsaturation is preferably conjugated with the acid group, such as with methacrylic acid, monoethyl maleate, and the like, but may be remote from the acid group if the copolymerization proceeds readily, such as with p-vinylbenzenesulfonic acid or acryloxypropionic acid. The unsaturated acid may be a sulfonic acid, such as styrenesulfonic acid, a partially esterified sulfuric acid, such as beta-sulfatoethyl methacrylate, a phosphonic aid, such as styrenephosphonic acid, a phosphoric acid, such as beta-phosphatoethyl acrylate, and the like. Preferred for ease of incorporation and availability are unsaturated carboxylic acids, or their immediate, readily available precursors, such as unsaturated anhydrides. Included are such monomers as acrylic acid, methacrylic acid, alpha-phenylacrylic acid, itaconic acid, maleic acid, fumaric acid, monoalkyl fumaric acid, methacrylic acid, acrylic acid, crotonic acid, alpha-methylene-delta-methyladipic acid, acryloxypropionic acid, p-vinylbenzoic acid, monovinyladipic acid, maleic anhydride, and the like. Especially preferred, for retention of glass temperature of the blend, availability, and ease of incorporation, is methacrylic acid. Total neutralization of the units derived from the copolymerized unsaturated acid is not necessary. It is preferred that at least about 10% to about 100% be neutralized.

It is preferred that a final outer shell be included, and that final outer stage should be at least about 10 weight percent of the final polymeric composition, preferably from about 15 to about 25 weight percent. That amount will aid in isolation of the additive, promote its free powder flow, yet not dilute too much the efficacy of the flow aid portion. The amount of the crosslinked stage should be from about 10 to about 50 parts of the total composition, preferably from about 20 to about 40 weight percent.

The invention further comprises a blended composition comprising a polymer of vinyl chloride and the additive polymers described above. The major utility of such blends will be when the blend composition has a melt viscosity, as measured under injection molding conditions, equal to or less than the melt viscosity for the polymer of vinyl chloride absent the additive polymer. The polymer of vinyl chloride may be a homopolymer of vinyl chloride, or a copolymer containing at least about 80 weight percent units derived from vinyl chloride and up to about 20 weight percent of units derived from one or more of propylene, ethylene, vinyl acetate, vinylidene chloride, or a lower alkyl acrylate. Preferred for injection molding purposes are polymers of vinyl chloride having a weight-average molecular weight of from about 40,000 to about 120,000, or a Fikentscher K value of from about 50 to about 60.

By "polymer of vinyl chloride" we further include chlorinated poly(vinyl chloride), which also will demonstrate improved processability when admixed with the additive polymers of the present invention.

For most uses, however, where exposure to heat may occur, it is preferred to use a homopolymer of vinyl chloride or a copolymer with a monomer whose homopolymer has a high glass temperature, such as styrene, alpha-methylstyrene, a maleimide, and the like, so as to obtain the highest value of heat distortion temperature for the blend. Especially preferred for cost and availability is the homopolymer of vinyl chloride. The polymers of vinyl chloride may be prepared by any of the known means; preferred are bulk and suspension polymerization.

The blended composition will preferably contain from about 2 to about 15 parts of the additive polymer per 100 parts of the polymer of vinyl chloride. The blend will preferably exhibit an immiscible or partly immiscible morphology at injection molding conditions, at least the core or first-stage component of the additive polymer being at least partially immiscible in the PVC matrix.

The additive polymer may be isolated from its preparative media by filtration and washing, if the polymer is insoluble in the media. If soluble, a precipitant may be added, the polymer filtered, washed, and dried. If the additive polymer is in the form of a non-aqueous dispersion, the solvent may be evaporated, and the polymer comminuted to powder. If the polymeric additive is formed in aqueous dispersion, it may be isolated by evaporation, by coagulation, or by spray-drying. This isolation may be accomplished in the presence of the PVC; for example, the aqueous dispersion may be evaporated onto the PVC and the mixture dried prior to addition of other additives and blending. Another method is to co-isolate aqueous dispersions of the PVC and the polymeric additive. Since PVC itself requires adjuvants for processing and/or improvement of its physical properties, the blend will preferably further contain one or more of impact modifier, lubricant, thermal stabilizer, plasticizer, surface-altering agent, organic pigment, heat-distortion improver additive, organic dye, or mold release agent. The PVC/additive blend may further contain one or more inorganic or organic filler or fiber.

The invention further encompasses film, sheet, extruded or molded articles, especially injection-molded articles, formed from the blend of PVC and the additive polymer.

The amount of the additive polymer of the present invention will vary depending on the processing conditions chosen and the molecular weight of the PVC resin used. For most uses, the blend will contain from about 1 to about 20 parts of the additive polymer per 100 parts of the polymer of vinyl chloride, but higher or lower levels may be employed in certain circumstances. Preferred for the best balance of efficacy without detracting from the physical properties of the blends is from about 2 to about 15 parts of the additive polymer.

For injection molding purposes, it is preferred that the additive polymer be partially or totally immiscible with the polymer of vinyl chloride during the injection molding process. The additive polymer and the polymer of vinyl chloride will exhibit an immiscible morphology at least in the molten state of the injection molding process, and possibly even when the melt is cooled. An immiscible morphology will exhibit itself in a lowering of transparency or a detection of one or more phases by microscopy or a detection of more than one glass temperature by, e.g., differential scanning calorimetry. A partially immiscible morphology will exhibit itself in a similar manner, but the glass temperatures may not be those of the corresponding phases when measured separately, but instead some dilution or modification of the value will be noted.

The additive polymer need not function as a processing aid per se as long as it functions to reduce the melt viscosity of the blend without adversely affecting other key properties. It may then be necessary to add a small amount of a conventional processing aid for PVC to aid in fluxing and processing the blend. Preferred is the case where the final shell polymer also functions as a processing aid.

So as not adversely to affect the flow of the blend upon processing, it is preferred that the weight-average molecular weight of any other stage of the multi-stage additive be below about 100,000. To exhibit the best efficiency, it is preferred that just enough of any other stage of the multi-stage polymer be present to aid in isolation, so that at least 50% weight percent of the multi-stage polymer, and preferably at least 70% of the multi-stage polymer, is the additive component.

For ease in dispersing the acrylic core stage, it is preferred that at least one stage, such as the final outer shell, of the multi-stage additive be miscible with the polymer of vinyl chloride, such as being a polymer formed predominantly of units derived from methyl methacrylate.

The polymeric additive is normally added to the poly(vinyl chloride) by dry-blending prior to processing. At the same time, other important ingredients necessary to processing the PVC without thermal decomposition may be added. Such stabilizers may be organotin compounds, such as dimethyl diisoctylthioglycolate, calcium-zinc salts of organic acids, such as calcium stearate or zinc stearate or their mixtures, organolead compounds, such as dibasic lead phosphite, organocadmium and organobarium compounds, and the like. Such stabilizers are usually present at levels from about 0.1 to about 5 parts per 100 parts of PVC resin, conventionally noted as phr.

Other additives may be present in the dry-blend, such as pigments, such as infra-red adsorbing pigments, dyes, and the like; plasticizers; other processing aids or lubricants designed to improve fluxing of the mix or avoidance of sticking to hot metal surfaces, such as butyl acrylate/styrene//methyl methacrylate or butyl acrylate//methyl methacrylate core/shell polymers with a low molecular weight core and a high molecular weight shell, and the like; other lubricants, such as long chain fatty acids, their salts, and their long chain esters, low molecular weight polyolefins, and the like; flame retardants or smoke retardants, such as zinc oxide, organophosphorus compounds, and the like; ultraviolet stabilizers, such as hindered phenols, hindered amines, aromatic o-hydroxyketones, and the like; heat distortion improvers, such as polyglutarimides, copolymers of isobornyl methacrylate, copolymers of alpha-methylstyrene/methyl methacrylate/acrylonitrile, copolymers of styrene or alpha-methylstyrene with maleic anhydride and/or a maleimide, and the like; and other additives known to the art.

Also present may be impact modifiers, at amounts of from about 3 to about 20 phr. Many materials are known to be impact modifiers for PVC. Such include core/shell polymers of a butadiene-based core, such as poly(butadiene), poly(butadiene-styrene), poly(butadiene-acrylonitrile), poly(butadiene-butyl acrylate), and the like, with one or more shells of poly(methyl methacrylate), poly styrene, poly(styrene-acrylonitrile), poly(styrene-methyl methacrylate), poly(styrene-methyl methacrylate-acrylonitrile), and the like. These core/shell polymers are efficient impact modifiers for non-weatherable applications.

Another useful class of impact modifiers are those based on poly(alkyl acrylates), such as core/shell modifiers with poly(butyl acrylate) cores, the butyl acrylate polymer being a homopolymer or a copolymer containing styrene, and further containing polyunsaturated monomers, such as divinylbenzene, glycol dimethacrylates, glycol diacrylates, polyol polymethacrylates, allyl methacrylate, and the like. The outer shell of such polymers is usually a polymer rich in units derived from methyl methacrylate or a copolymer of styrene with acrylonitrile.

Other classes of impact modifiers may also be employed, such as single- or multi-stage polymers based on an ethylene-propylene or ethylene-propylene-non-conjugated diene rubber, or a butadiene-acrylonitrile rubber, or a silicone-based elastomer, or a ethylene-vinyl acetate rubber, or chlorinated polyethylene.

There may further be present one or more of a variety of fillers, either reinforcing or non-reinforcing. Such fillers, which include fibrous, flaked, and powdery materials, will be present in amounts from about 1 to about 50 phr. They may contain chemical coupling agents, such as organotitanates or functionalized silicon additives, to aid in adhesion to the PVC. Such fillers include glass fiber, glass flakes, glass microspheres; other mineral fibers; talc, wollastonite, mica, and the like; carbon black; alumina, silica, titanium dioxide, and the like.

As noted, it is most common to combine all ingredients of the PVC blend prior to actual melt-processing, although additives may be added to the melt if desired. Normally the dry blend is then processed with heat and shear, such as in an intensive mixer, such as a Brabender or Banbury, on a two-roll mill, or in an extruder, until the PVC has "fluxed" or passed to a molten form. The fluxed material may then be dropped from the mixers, or sheeted into forms suitable for compression molding, or for re-melting and re-processing.

For most uses, the molten polymer is conveyed through an extruder, usually either a single-screw or double-screw extruder at temperatures and shear conditions sufficient to convey the molten material readily but without causing over-heating and degradation. The melt may then be passed through one or more dies into strands for pelletizing, with the pellets later be re-processed into the final desired article. On the other hand, the melt may be directly converted into the final object by such operations as passing through an appropriate die to form a sheet, film, or profile-shaped article. The melt may also be formed into parisons for subsequent blow-molding. The melt may also be injection-molded by injection into an appropriate mold to form molded objects.

For the latter operation especially, the melt needs to be fluid to fill the mold rapidly and completely at as low a temperature and pressure of processing as possible. Otherwise, molding will take longer or require more extreme conditions of temperature and pressure, which is both uneconomical and leading to polymer degradation.

Several means exist for measuring the effect of the additive on the flow behavior of the PVC compound. One is to compare the extent of mold fill in a long spiral mold under similar pressure/temperature conditions versus a PVC compound absent the additive, or against commercially purchased PVC injection molding blends. A second test is to measure pressure required to fill such a mold against such controls. A third is to measure a melt flow rate, extruding through a standardized orifice at standard conditions and measuring the amount of polymer extruded in 10 minutes versus such controls. A fourth is to compare viscosity values measured over a range of shear rates at a constant temperature in a commercial device for obtaining viscosity-shear rate response, such as a capillary rheometer. A fifth method is by comparing the value of equilibrium torque in a mixing device designed to measure torque at various temperatures of mixing as a value of time, such as certain rheometers.

Poly(vinyl chloride) containing the additives of the present invention may be converted into many useful forms. Injection-molded PVC may be used to form many objects by direct injection molding, that is, molding into objects which require no further formation, such as stretching, blowing, etc., for consumer use. Such objects include toys, novelty items, automobile interior parts, such as trim knobs, door latches and lock handles, connectors, seat belt latch covers, ashtrays, fuse boxes, and the like, other automotive uses, such as bumpers, wheel wells, liners, parts for under-the-hood use, such as windshield washer and other aqueous fluid reservoirs, electrical connections, and the like, medical products, such as syringes and stoppers, appliance parts, such as lint filter housings for washing machines, spin tubs or agitators for washing machines, pump components, blower wheels, insulators, fan protective grills, switch housings, handles, and the like, household uses, such as bowls, cups, containers, covers for containers, such as coffee can lids, boxes for packaging of film, tape, disks, and the like, components of such recording devices, such as cassettes, film spindles, and the like, packaging uses, such as automotive dunnage, trays, and the like, tool handles, electrical plugs, pails, tubs, waste containers, laundry baskets, bottle base cups, paint cans, closures, such as for carbonated beverage containers, parts for appliances, such as refrigerator crispers, door liners, and the like, and many other similar forms.

Blow-molding may also be utilized to form useful objects by forming an extruded- or injection molded parison, then inflating and forming the parison in to the desired shape. Thus, bottles and other containers, and many other similar objects, may be prepared. The PVC compound containing the additive may also contain a chemical blowing agent, which will decompose at a higher temperature of processing to release a gas for causing the molten PVC to form foam, maintaining enough melt strength to retain the foamed shape on cooling. A gas may also be injected into the melt to form the foam.

The PVC compound containing the additive may be employed in the manufacture of many useful objects in profile form, such as clips, scrapers, luggage beads, garden edging, door stripping, gutters, downspouts, corrugated roofing, window and door casings, window tracks, siding, rub/bruise strips, such as for cars and appliances, coated wire, picture framing, pipe for drain, waste, or vent use, electrical conduit, ducts, sheathings for wood, protective fascia, such as for automobiles, automotive liners, appliance components such as liners, hinges, edgings, trays, and the like, beam covers, straws for consuming drinks, troughs, corrugated tubing, support poles, such as for plants, ski poles, and the like. The additive polymer will also be useful in processing blends of PVC with other polymers with which it is compatible, such as acrylonitrile-butadiene-styrene resins, and the like.

EXAMPLES

The following examples describe the synthesis of the additives and the testing of the additives in a PVC formulation for flow, impact, and heat distortion effects. BA=n-butyl acrylate; MMA=methyl methacrylate; ALMA=allyl methacrylate; n-DDM=n-dodecyl mercaptan.

A. PREPARATION OF MULTISTAGE FLOW IMPROVING ADDITIVES

Example 1

This example described the preparation of a three-stage core/shell additive of the structure 50.5 BA/n-DDM//34.5 BA/ALMA//15 MMA/n-DDM=100 (1%)//100 (1.5%)//100 (0.8%).

Stage I—Uncrosslinked polybutyl acrylate

In a glass reactor, 663 g deionized water and 20 g of 2 wt. % acetic acid are mixed and heated to 55° C. Nitrogen gas is bubbled through this solution for at least 20 minutes. At 55° C. under a continuous nitrogen sweep, 1.07 g 28% sodium lauryl sulfate aqueous solution diluted with 10 g water are added to the flask. Then a mixture of 100 g n-butyl acrylate and 1 g n-dodecyl mercaptan is added to the flask followed by 50 g rinse water. After the mixture is stirred for 2 minutes, 80 g of 5% sodium formaldehyde sulfoxylate aqueous solution and 28 g of 5% t-butyl hydroperoxide aqueous solution are charged to the flask. An exotherm of 12°-14° C. is observed. After reaching the peak temperature, a pre-emulsified monomer mixture containing 700 g water, 56.07 g 28% sodium lauryl sulfate solution, 1900 g n-butyl acrylate and 19 g n-dodecyl mercaptan are introduced into the reactor gradually in three hours. At the same time, 180 g 5% t-butyl hydroperoxide aqueous solution are also added in three hours. At the beginning of the three hours and in the middle of the three hours, 40 g of 5% sodium formaldehyde sulfoxylate solution are added to the reaction mixture (total of 80 g). When the gradual feed is complete, a temperature of 78°-80° C. is usually achieved. The monomer emulsion container is rinsed with 200 g water and this rinse water is charged to the reactor. Fifteen minutes after the feed, 16 g of 5% sodium formaldehyde sulfoxylate solution and 8 g of 5% t-butyl hydroperoxide solution are added to the reactor. The mixture is allowed to cool to room temperature. The solids content of this final emulsion is 49.6% and the polymerization conversion is 99.2%; the molecular weight is 64,000 ($M_w$).

Stage II—Encapsulating polymer stage

A mixture of 1966 g Stage I emulsion, 698 g water, and 26.8 g of 28% sodium lauryl sulfate is heated to 55° C. under a nitrogen sweep. In 80 minutes, a monomer mixture containing 654.6 g n-butyl acrylate and 9.82 g allyl methacrylate is gradually added to the reactor. At the same time, 52.3 g of 5% t-butyl hydroperoxide aqueous solution are also gradually added in 80 minutes. Two additions of 26.2 g 5% sodium formaldehyde sulfoxylate solution each are added to the reactor at the beginning and in the middle of the gradual feed period. The temperature at the end reaches 68° C. After a 30 minute hold at a temperature of 60° C., 99.8% conversion is achieved.

Stage III—Final outer stage

The Stage II emulsion described above is cooled to 55° C. Then 12.2 g of 5% sodium formaldehyde sulfoxylate solution are added. A mixture of 287.6 g methyl methacrylate and 2.29 g n-dodecyl mercaptan is added to the reaction mixture in 30 minutes and 12.2 g of a 5% t-butyl hydroperoxide solution are also added in 30 minutes. At the end of the gradual addition, 50 g water are used to rinse the monomer container and then added to the reactor. The mixture is held at 60° C. for 15 minutes. Polymerization of the residual monomer is completed by an addition of 2.4 g 5% t-butyl hydroperoxide solution and 2.4 g 5% sodium formaldehyde sulfoxylate solution. The final emulsion has a solids content of 49.8% and a conversion of 99.5%. The $M_w$ for a poly(methyl methacrylate) prepared with 0.8 wt. % n-dodecyl mercaptan is ca. 100,000.

Coagulation of Example 1

3212 g of the final emulsion are diluted with 2149 g water. The emulsion is then poured slowly into 10667 g of 0.475% calcium chloride solution at room temperature. The coagulated latex polymer is filtered and washed with 5000 g water. The powder is then dried in a 50° C. vacuum oven.

Example 2

This example describes the preparation of a core/shell additive with both ionic and covalent crosslinking of the intermediate state, and the neutralization of the methacrylic acid component to form the ionomer. The structure is 50.5 BA/(n-DDM)//345 BA/(ALMA)/(MAA)//15MMA(n-DDM) 100/(1%)//100/(0.6%)/(3%)//100 (0.8)

Stage I—Uncrosslinked polybutyl acrylate

The process of Stage I of Example 1 was repeated.

Stage II—Encapsulating Polymer Stage

A mixture of 1966 g Stage I emulsion, 698 g water and 26.8 g of 28% sodium lauryl sulfate solution is heated to 55° C. under nitrogen sweep. In 80 minutes, a monomer mixture containing 636.6 g n-butyl acrylate, 19.14 g methacrylic acid and 3.90 g allyl methacrylate is gradually added to the reactor. At the same time, 52.3 g of 5% t-butyl hydroperoxide aqueous solution are also gradually added in 80 minutes. Two additions of 26.2 g 5% sodium formaldehyde sulfoxylate solution each are added to the reactor at the beginning and in the middle of the gradual feed period. The temperature at the end reaches 68° C. 50 g water are used to rinse the monomer container and the rinse water is added to the reactor afterwards. After a 30 minute hold at a temperature of 60° C., 99.8% conversion is achieved.

Stage III—Final Outer Stage

The Stage II emulsion described above is cooled to 55° C. Then a solution of 12.2 g 5% sodium formaldehyde sulfoxylate is added. A mixture of 287.6 g methyl methacrylate and 2.29 g n-dodecyl mercaptan is added to the reaction mixture in 30 minutes and 12.2 g 5% t-butyl hydroperoxide solution are also added in 30 minutes. At the end of the gradual addition, the mixture is held at 60° C. for 15 minutes. Polymerization of the residual monomer is completed by an addition of 2.4 g 5% t-butyl hydroperoxide solution and 2.4 g 5% sodium formaldehyde sulfoxylate solution. The final emulsion has a solids content of 49.7% and a conversion of 99.5%.

Neutralization of Example 2

To 3624 g of the final emulsion, 167.2 g 5% sodium hydroxide aqueous solution and 559 g water are added under stirring. The mixture is stirred at room temperature for 18 hours. The final pH of the emulsion is 10.1.

Coagulation of Example 2

3863 g of the neutralized emulsion are diluted with 2147 g water. The emulsion is then gradually poured into 10,667 g 0.475% calcium chloride aqueous solution at 5° C. The coagulated latex is isolated by filtration followed by washing with 4800 g water. The powder is dried in a 50° vacuum oven.

Example 3

This example describes a three-stage core/shell additive of the structure 50.5 BA/St/n-DDM//34.5 BA/(-MAA)/(ALMA)//15 MMA/(n-DDM) 80/20 (1%)//100/(3%)/(0.6%)//100 (0.8%).

Stage 1—Uncrosslinked butyl acrylate/styrene copolymer

In a glass reactor, 663 g deionized water and 20 g of 2 wt. % acetic acid are mixed and heated to 55° C. Nitrogen gas is bubbled through this solution for at least 20 minutes. At 55° C. under a continuous nitrogen sweep, 1.07 g 28% sodium lauryl sulfate aqueous solution diluted with in 10 g water are added to the flask. Then a mixture of 80 g n-butyl acrylate, 20 g styrene and 1 g n-dodecyl mercaptan is added to the flask followed by 50 g rinse water. After the mixture is stirred for 2 minutes, 80 g of 5% sodium formaldehyde sulfoxylate aqueous solution and 28 g of 5% t-butyl hydroperoxide aqueous solution are charged to the flask. An exotherm of 12°–14° C. is observed within 15 minutes. After reaching the peak temperature, a pre-emulsified monomer mixture containing 700 g water, 56.07 g 28% sodium lauryl sulfate solution, 1520 g n-butyl acrylate, 380 g styrene and 19 g n-dodecyl mercaptan is introduced into the reactor gradually in three hours. At the same time, 180 g 5% t-butyl hydroperoxide aqueous solution are also added in three hours. At the beginning of the three hours and in the middle of the three hours, 40 g of 5% sodium formaldehyde sulfoxylate solution are added to the reaction mixture (total of 80 g). When the gradual feed is complete, a temperature of 78°–80° C. is usually achieved. The monomer emulsion container is rinsed with 200 g water and this rinse water is charged to the reactor. Fifteen minutes after the feed, 16 g of 5% sodium formaldehyde sulfoxylate solution and 8 g of 5% t-butyl hydroperoxide solution are added to the reactor. The mixture is allowed to cool to room temperature. The solids content of this final emulsion is 49.6% and the polymerization conversion is 99.2%.

Stage II—Encapsulating Polymer Stage

A mixture of 1966 g Stage I emulsion, 698 g water, and 26.8 g of 28% sodium lauryl sulfate solution is heated to 55° C. under nitrogen sweep. In 80 minutes, a monomer mixture containing 636.6 g n-butyl acrylate, 19.14 g methacrylic acid, and 3.90 g allyl methacrylate is gradually added to the reactor. At the same time, 52.3 g of 5% t-butyl hydroperoxide aqueous solution are also gradually added in 80 minutes. Two additions of 26.2 g 5% sodium formaldehyde sulfoxylate solution each are added to the reactor at the beginning and in the middle of the gradual feed period. The temperature at the end reaches 68° C. 50 g water are used to rinse the monomer container and are added to the reactor afterwards. After a 30 minute hold at temperature of 60° C., 99.2% conversion is achieved.

Stage III—Final Outer Stage

The Stage II emulsion described above is cooled to 55° C. Then 12.2 g of 5% sodium formaldehyde sulfoxylate solution are added. A mixture of 287.6 g methyl methacrylate and 2.29 g n-dodecyl mercaptan is added to the reaction mixture in 30 minutes and 12.2 g of a 5% t-butyl hydroperoxide solution are also added in 30 minutes. At the end of the gradual addition, the mixture is held at 60° C. for 15 minutes. Polymerization of the residual monomer is completed by an addition of 2.4 g 5% t-butyl hydroperoxide solution and 2.4 g 5% sodium formaldehyde sulfoxylate solution. The final emulsion has a solids content of 49.7% and a conversion of 99.4%.

Neutralization of Example 3

To 3624 g of the final emulsion, 167.2 g of 5% sodium hydroxide aqueous solution are added under stirring. The mixture is stirred at room temperature for 18 hours. The final pH of the emulsion is 10.1.

Coagulation of Example 3

The neutralized emulsion is diluted with 2,230 g water. The emulsion is then gradually poured into 12,100 g 0.475% calcium chloride aqueous solution at 5° C. The coagulated latex is isolated by filtration followed by washing with 5,000 g water. The powder is dried in a 50° C. vacuum oven.

B. PROCESSING TECHNIQUES FOR PVC/MULTISTAGE ADDITIVE BLENDS

1. Blending

The PVC injection molding formulations were prepared by blending all of the formulation components except the flow improving additive in a 35-lb (15.9 kg) Henschel mixer. The formulation components are shown in Table 1. The blending procedure involves mixing the PVC resin alone in the high-intensity mixer until it shear heats to 52° C. The liquid organotin stabilizer is then added to the blend. The blend is allowed to shear heat to 66° C. and the lubricants, glyceryl monostearate and a polyolefin wax, are added to the blend. The blend is allowed to shear heat to 77° C. and the acrylic processing aid and the acrylic impact modifier are added. The blend is permitted to shear heat to 82° C. and the TiO$_2$ is added. High intensity mixing is continued until the blend temperature reaches 95° C. The blend is then cooled with only slow stirring to 60° C. by circulating water through the mixer jacket. The blend, which will be referred to as the PVC masterbatch, is removed from the mixer at approximately 60° C.

The blends containing flow improving additives are prepared by mixing the desired amounts of PVC masterbatch and flow improving additive together in a 5-lb high intensity blender at room temperature for five minutes (the blend temperature will exceed room temperature due to shear heating but no additional heat is applied).

Table 1: PVC Injection Molding Formulation 100.0 phr PVC (K=60) Resin
2.0 phr dimethyltin bis(2-ethylhexylthioglycolate)
2.7 phr glycerol monostearate
0.3 phr polyolefin wax-external lubricant
1.0 phr high Mw poly(MMA/EA) copolymer
8.0 phr core/shell BA//MMA copolymer 1.5 phr TiO$_2$
0,4 or 8 phr Flow Improving Additive

2. Extruding and Pelletizing

The blends are extruded using an American Leistritz counter-rotating twin-screw extruder and pelletized. The extruder is equipped with 34 mm counter-rotating screws. There are five barrel sections giving a total length to diameter ratio of 15.9. The barrel temperatures are set at 140°/145°/150°/155° C. (Note: no heat to first barrel) and the die temperature is set at 160° C. The blends are extruded into a single strand through a ¼" diameter die and cooled by passing through a water bath before being chopped into pellets.

3. Injection Molding

ASTM parts for impact testing are molded using an ASTM parts cluster Master Unit Die insert in an Arburg 270-90-350 injection molding machine. The injection molding machine has a 22 mm diameter screw with a length to diameter ratio of 20.5 and a compression ratio of 2.1. The barrel temperatures are set at 146°, 171°, and 177° C. and the nozzle temperature is set at 186° C. These settings produce a melt temperature of approximately 210° C. as measured for an air shot using a hand-held pyrometer with needle probe. The mold temperature is 32° C. The screw speed is set at 200 rpm. An ⅛" (3.175 mm) thick Izod impact bar, a ¼" (6.35 mm) thick Izod impact bar, and a 2"×3"×⅛" (50.8 mm×76.2 mm×3.175 mm) plaque for instrumented drop dart impact are molded from each shot.

The spiral flow molding was done using a spiral shape Master Unit Die insert in the same machine with the same barrel temperatures, mold temperature, and screw speed.

Example 4

Flow Improvement of PVC Blends Containing Multistage Flow Improving Additives

PVC formulation blends with 4 phr and 8 phr (phr=parts per hundred resin) of the flow improving additives are prepared according to the procedures described above. Spiral flow molding is conducted to measure the flow effects of the additives. The additives are referred to as A, B, and C; A is prepared by the method of Example 1, B by the method of Example 2, and C by the method of Example 3. The spiral flow lengths are measured for three different injection pressures for each blend. The spiral flow data are compiled in Table 2. The spiral flow length values shown in the table correspond to the averages and standard deviations (in parentheses) based on sets of five measurements for each blend. These data show that the additives significantly increase the material flow in the injection mold.

TABLE 2

| | | Spiral Flow Measurements | | |
|---|---|---|---|---|
| | Flow Improving | Spiral Flow Length (cm) for Injection Pressure P | | |
| Blend | Additive | P = 476 bar | P = 714 bar | P = 1582 bar |
| 1 | None | 10.52 (±0.28) | 16.97 (±0.10) | 44.45 (±1.04) |
| 2 | 4 phr A | 11.94 (±0.00) | 18.85 (±0.20) | 49.28 (±1.02) |
| 3 | 4 phr B | 10.72 (±0.10) | 17.27 (±0.00) | 47.22 (±1.40) |
| 4 | 4 phr C | 11.23 (±0.10) | 17.68 (±0.13) | 47.19 (±1.09) |
| 5 | 8 phr A | 14.02 (±0.10) | 22.35 (±0.30) | 57.45 (±0.23) |
| 6 | 8 phr B | 13.46 (±0.48) | 21.95 (±0.13) | 56.79 (±0.13) |
| 7 | 8 phr C | 15.75 (±0.30) | 23.83 (±0.33) | 59.18 (±0.25) |

Example 5

Impact Properties of PVC Blends Containing Multistage Flow Improving Additives

PVC formulation blends are prepared with 8 phr of the flow improving additives A, B, and C (corresponding to Examples 1,2, and 3, respectively) according to the procedures described previously. ⅛" (3.175 mm) thick and ¼" (6.35 mm) thick Izod bars are injection molded. The notched Izod impact properties of these molded bars are tested according to ASTM Standard D256. Test temperatures of 15° C., 18° C., and 23° C. are used for the ⅛" thick samples. Test temperatures of 18° C. and 23° C. are used for the ¼" thick samples. Impact measurements are made on five bars for each blend. The impact measurement averages for hinge and clean breaks are given in Tables 3 and 4. The numbers in parentheses represent the percentage of samples that break in each mode when more than one type of fracture is observed. The measurements show that the ductility of the blends is retained to lower temperatures for the blends containing the flow improving additives as compared with the PVC blend without the additives. The Izod impact strengths for brittle (complete) fractures are also increased for the blends containing the flow improving additives.

TABLE 3

| | | Notched Izod Impact Measurements for ⅛" (3.175 mm) Thick Samples | | | | | |
|---|---|---|---|---|---|---|---|
| | Flow Improving | Notched Izod Impact Strength (J/m) | | | | | |
| | | 15° C. | | 18° C. | | 23° C. | |
| Blend | Additive | Hinge | Complete | Hinge | Complete | Hinge | Complete |
| 1 | None | — | 70 | — | 161 | 1178 | — |
| 2 | 8 phr A | 880 (20%) | 228 (80%) | 947 | — | 1067 | — |
| 3 | 8 phr B | 975 (60%) | 179 (40%) | 984 | — | 1092 | — |
| 4 | 8 phr C | — | 197 | 904 (40%) | 317 (60%) | 947 | — |

TABLE 4

| | | Notched Izod Impact Measurements for ¼" (6.35 mm) Thick Samples | | | |
|---|---|---|---|---|---|
| | Flow Improving | Notched Izod Impact Strength (J/m) | | | |
| | | 18° C. | | 23° C. | |
| Blend | Additive | Hinge | Complete | Hinge | Complete |
| 1 | None | — | 86 | — | 94 |
| 2 | 8 phr A | 945 | — | 954 | — |
| 3 | 8 phr B | 916 | — | 945 | — |
| 4 | 8 phr C | 839 | — | 905 | — |

Example 6

Vicat Softening Temperature Measurements

One of the desired characteristics of the flow improving additives is that they not decrease the heat distortion temperature of the PVC formulation. Vicat softening temperatures are measured on ¼" (6.35 mm) thick molded bars for 1 and 5 kg loads at a heating rate of 120° C./hr according to ASTM Standard D1525. The data are shown in Table 5. The values represent the average of two temperature readings for each sample. The data indicate that the additives do not have a significant effect on the 1 kg load Vicat temperature and only a small effect (~1° C.) on the 5 kg load Vicat temperature.

TABLE 5

Vicat Softening Temperatures for ¼" (6.35 mm) Thick Molded Samples under 1 kg and 5 kg Loads

| Blend | Flow Improving Additive | Vicat Softening Temperatures (°C.) 1 kg Load | 5 kg Load |
|---|---|---|---|
| 1 | None | 82.6 | 75.1 |
| 2 | 8 phr A | 82.1 | 73.9 |
| 3 | 8 phr B | 82.0 | 74.0 |
| 4 | 8 phr C | 83.5 | 74.3 |

We claim:

1. A core/shell polymer comprising:
   A) a core of a polymer containing at least about 80 weight percent of units derived from a higher alkyl (meth)acrylate, the higher alkyl group containing from four to twelve carbon atoms, the core polymer not containing units derived from a graftlinking or crosslinking monomer, and the core polymer not being deliberately crosslinked;
   B) an intermediate stage of a crosslinked polymer, the crosslinked polymer containing:
      1) at least about 90 weight percent of units derived from one or more of vinyl aromatic monomers or alkyl esters of (meth)acrylic acid, wherein the alkyl esters are derived from alcohols of from one to four carbon atoms,
      2) from about 0.5 to about 10 weight percent of units derived from at least one of:
         a) a multifunctional monomer containing two or more copolymerizable double bonds; or
         b) an alkali, alkaline earth, or transition metal salt of a copolymerizable unsaturated acid;
   C) a final shell stage of a polymer containing at least about 70 weight percent of units derived from one or more of vinyl aromatic monomers or lower alkyl esters of methacrylic acid, wherein the lower alkyl esters are derived from alcohols of from one to four carbon atoms.

2. A core/shell polymer comprising:
   a) a core of a polymer containing at least about 80 weight percent of units derived from a higher alkyl (meth)acrylate, the higher alkyl group containing from four to twelve carbon atoms, the core polymer not containing units derived from a graftlinking or crosslinking monomer, and the core polymer not being deliberately crosslinked;
   b) a shell stage of a crosslinked polymer, the crosslinked polymer containing:
      1) at least about 90 weight percent of units derived from one or more of vinyl aromatic monomers or alkyl esters of (meth)acrylic acid, wherein the alkyl esters are derived from alcohols of from one to four carbon atoms,
      2) from about 0.5 to about 10 weight percent of units derived from at least one of:
         a) a multifunctional monomer containing two or more copolymerizable double bonds
         b) an alkali, alkaline earth, or transition metal salt of a copolymerizable unsaturated acid.

3. The composition of claim 1, wherein the higher alkyl (meth)acrylate is n-butyl acrylate and the lower alkyl ester of methacrylic acid the methyl ester.

4. The composition of claim 2, wherein the higher alkyl (meth)acrylate is n-butyl acrylate and the alkyl ester of (meth)acrylic acid is methyl methacrylate.

5. The composition of claims 1 or 2, wherein the unsaturated acid is a carboxylic acid selected from the class consisting of methacrylic acid, acrylic acid, itaconic acid, maleic acid, fumaric acid, alpha-methylene-delta-methyladipic acid, and acryloxypropionic acid.

6. The composition of claim 5, wherein the unsaturated carboxylic acid is methacrylic acid.

7. The composition of claims 1 or 2, wherein the alkali salt is sodium, and wherein the molecular weight of the core polymer is from about 5,000 to about 100,000.

8. A composition comprising:
   a) a polymer of vinyl chloride;
   b) a core/shell polymer comprising:
      1) a core of a polymer containing at least about 80 weight percent of units derived from a higher alkyl (meth)acrylate, the higher alkyl group containing from four to twelve carbon atoms, the core polymer not containing units derived from a graftlinking or crosslinking monomer, and the core polymer not being deliberately crosslinked;
      2) an intermediate stage of a crosslinked polymer, the crosslinked polymer containing:
         i) at least about 90 weight percent of units derived from one or more of vinyl aromatic monomers or alkyl esters of (meth)acrylic acid, wherein the alkyl esters are derived from alcohols of from one to four carbon atoms,
         ii) from about 0.5 to about 10 weight percent of units derived from at least one of:
            a) a multifunctional monomer containing two or more copolymerizable double bonds;
            b) an alkali, alkaline earth, or transition metal salt of a copolymerizable unsaturated acid;
      3) optionally, a final shell stage of a polymer containing at least about 70 weight percent of units derived from one or more of vinyl aromatic monomers or lower alkyl esters of methacrylic acid, wherein the lower alkyl esters are derived from alcohols of from one to four carbon atoms.

9. The composition of claim 8, having a melt viscosity, as measured under injection molding conditions, equal to or less than the melt viscosity for the polymer of vinyl chloride absent the additive polymer.

10. The composition of claim 8, wherein the polymer of vinyl chloride is a homopolymer of vinyl chloride.

11. The composition of claim 8, wherein the polymer of vinyl chloride is a copolymer containing at least about 80 weight percent units derived from vinyl chloride and up to about 20 weight percent of units derived from one or more of propylene, ethylene, vinyl acetate, vinylidene chloride, or a lower alkyl acrylate.

12. The composition of claim 8, wherein the polymer of vinyl chloride has a weight-average molecular weight of from about 40,000 to about 120,000 or a Fi-kentscher K value of from about 50 to about 60.

13. The composition of claim 8, wherein the composition contains from about 2 to about 15 parts of the additive polymer per 100 parts of the polymer of vinyl chloride.

14. The composition of claim 9 having an immiscible or partly immiscible morphology at injection molding conditions.

15. The composition of claim 8, wherein the composition further contains one or more of impact modifier, lubricant, thermal stabilizer, plasticizer, surface-altering agent, organic pigment, heat-distortion improver additive, organic dye, or mold release agent.

16. The composition of claim 8, wherein the composition further contains inorganic or organic filler or fiber.

17. The composition of claim 15, wherein the composition further contains inorganic or organic filler or fiber.

18. A film, sheet, extruded or injection-molded object formed from the composition of claim 15.

19. A film, sheet, extruded or injection-molded object formed from the composition of claim 16.

* * * * *

UNITED STATES PATENT AND TRADEMARK OFFICE
CERTIFICATE OF CORRECTION

PATENT NO. : 5,194,498

DATED : March 16, 1993

INVENTOR(S) : Janis C. Stevenson and Hsing-Yeh Parker

It is certified that error appears in the above-identified patent and that said Letters Patent is hereby corrected as shown below:

Column 15, lines 34-35

Should read "units derived from one or more"

Signed and Sealed this

Sixteenth Day of November, 1993

Attest:

BRUCE LEHMAN

Attesting Officer     Commissioner of Patents and Trademarks